Figure 1:
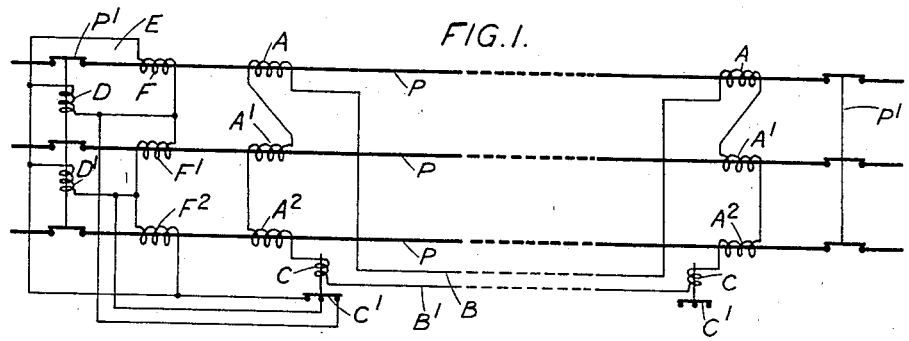

Jan. 3, 1928.

R. W. BILES 1,655,307

PROTECTIVE ARRANGEMENT FOR A. C. ELECTRIC CIRCUITS

Filed Jan. 21, 1927

INVENTOR
R. W. Biles,
BY Watson, Coit, Morse & Grindle.
ATT'YS

Patented Jan. 3, 1928.

1,655,307

UNITED STATES PATENT OFFICE.

REGINALD WILLIAM BILES, OF BALCOMBE, ENGLAND, ASSIGNOR TO A. REYROLLE & COMPANY LIMITED, OF HEBBURN-ON-TYNE, ENGLAND, A COMPANY OF GREAT BRITAIN.

PROTECTIVE ARRANGEMENT FOR A. C. ELECTRIC CIRCUITS.

Application filed January 21, 1927, Serial No. 162,656, and in Great Britain February 18, 1926.

This invention relates to protective arrangements for A. C. electric circuits, wherein the secondaries of protective current transformers are connected by pilot wires and circuit-breakers are tripped as a result of the operation of relays connected in the pilot circuit. In such arrangements it is usual for the relays to control local circuits including a trip coil and a local battery or other auxiliary source of power.

The present invention has for its object to avoid the necessity for such local batteries or auxiliary sources of power. One method of achieving this object has been described inter alia in the specification accompanying the present applicant's copending United States Patent application Serial No. 118,076, filed 23rd June, 1926, wherein the relays act when operated to short-circuit or otherwise to modify the pilot circuit and thus enable the relatively small power of the protective current transformers usually employed to be utilized to operate the trip coils.

In the arrangement according to the present invention the protective apparatus at each end of the protected circuit comprises protective current transformers having their secondaries connected in the pilot circuit, one or more relays in the pilot circuit, and an independent circuit containing one or more trip coils and the secondaries of separate current transformers whose primaries are connected in the protected circuit, such independent circuit being so arranged that when the relays operate one or more of the trip coils are energized from the separate current transformer secondaries.

When the invention is applied to the protection of polyphase circuits, similar current transformers are preferably employed in the several phases having their secondaries so connected in the independent circuit as to give equal values of the tripping current for all types of fault. Thus in a three-phase system the independent circuit may contain the secondaries of three current transformers connected in reverse delta and two trip coils so arranged that on the operation of the relay or of one or more of the relays one or each trip coil is connected across one of the secondaries. Alternatively the independent circuit may contain the secondaries of three current transformers and three trip coils one associated with each secondary, the connections being such that when a relay operates one of the trip coils is connected across its secondary. Other arrangements of the independent circuit may however be employed.

In the case when a two-core pilot circuit is employed, the connection of the trip coils to the separate current transformers is conveniently brought about by the operation of a single relay at each end of the pilot circuit. When a three-core pilot circuit is employed (one core for each phase) a relay may be provided in each core at each end, the connections being such that whichever relay operates at least one of the trip coils will be brought into circuit with a current transformer secondary.

Preferably the trip coils are permanently connected to the current transformer secondaries in the independent circuit, but are normally short-circuited by the relay contacts.

Figure 2:
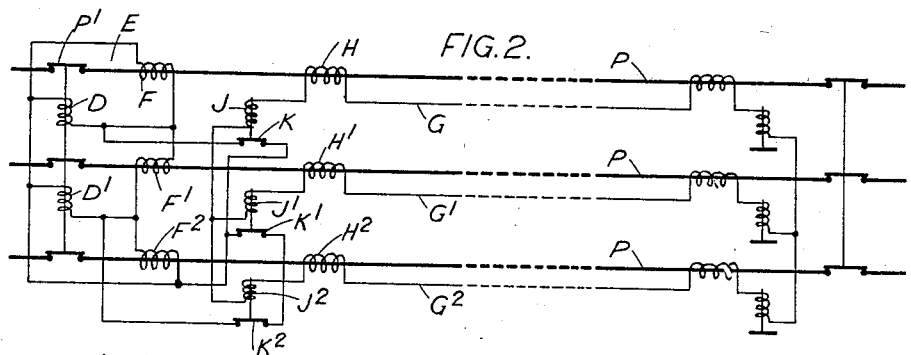
Figure 3:
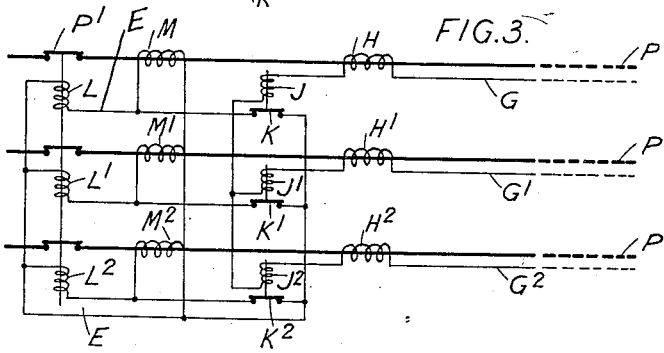
Figure 4:
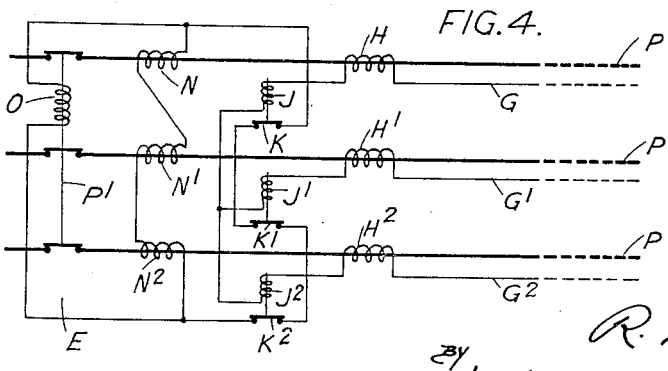

The invention may be carried into practice in various ways, but some preferred arrangements according thereto, as applied to the protection of a three-phase feeder, are illustrated diagrammatically in the accompanying drawings, in which Figure 1 shows an arrangement employing a two-core pilot circuit, Figure 2 shows a similar arrangement employing a three-core pilot circuit, and Figures 3 and 4 show modifications of the arrangement shown in Figure 2.

In the arrangement of Figure 1 three protective current transformers are provided at each end of the protected feeder P, with their secondaries A A¹ A² connected in series with one another and with a two-core pilot circuit B B¹, these transformers being so arranged (as for example in reverse delta as shown) as to give protection against earth faults and against interphase faults. A single relay C is provided at each end of the pilot circuit B B¹ with its operating coil in series with that circuit. This relay C has its contacts C¹ normally closed and serving to short-circuit two trip coils D D¹ in an independent circuit E. The operation of the relay C serves to break the short-circuit on the trip coils D D¹.

The independent circuit E contains the secondaries F F¹ F² of three similar current transformers whose primaries are connected one in each phase of the protected circuit. These secondaries F F¹ F² are connected together in reverse delta and each of the two (normally short-circuited) trip coils D D¹ is connected across one of the secondaries.

Thus when a fault occurs, the relay C opens its contacts C¹ and removes the short-circuit on the trip coils D D¹. These trip coils are thus brought into circuit with the secondaries F F¹ F² and are energized to trip the adjacent circuit-breaker P⁷ in the protected circuit.

For the sake of simplicity the independent circuit E is shown at one end only of the feeder but it will be understood that (as also in Figures 2—4) the circuits at both ends of the feeder are arranged in exactly the same manner.

In the arrangement of Figure 2 a three-core pilot circuit G G¹ G² is used, one core for each phase. Each core has in series with it at each end the secondary H (or H¹ or H²) of a protective current transformer and the operating coil J (or J¹ or J²) of a relay. The contacts K K¹ K² of the three relays are normally closed and short-circuit the two trip coils D D¹ in the independent circuit E, which is arranged in the same manner as in the previous arrangement (the same reference letters being employed). The three sets of relay contacts K K¹ K² may be connected in series with one another, so that the opening of any one will remove the short-circuit from both trip coils. Alternatively (as shown) they may be so connected that the opening of one set of contacts K will remove the short-circuit from one trip coil D leaving the other D¹ still short-circuited whilst the opening of either of the other sets K¹ K² will remove the short-circuit from the second trip coil D¹ leaving the first D short-circuited.

The arrangement of Figure 3 employs a three-core pilot circuit G G¹ G² arranged in the same manner as in the arrangement of Figure 2 (the same reference letters being employed). The independent circuit E is however differently arranged. In this case three trip coils L L¹ L² are employed, one in series with each transformer secondary M M¹ M². The three secondaries M M¹ M² with their associated trip coils L L¹ L² may be connected together in star (as shown) or in delta. Each trip coil L (or L¹ L²) is normally short-circuited by the contacts K (or K¹ or K²) of the relay J (or J¹ or J²) in the same phase. Thus when one relay, say J, opens its contacts K, one of the trip coils L will be brought into circuit with its transformer secondary M, the other two trip coils L¹ L² remaining short-circuited.

The independent circuit E containing three trip coils as shown in Figure 3 may also be employed with a two-core pilot system of the kind shown in Figure 1, the normal short-circuit being simultaneously removed from the three coils when the single relay C operates.

In all the foregoing arrangements the three transformers having secondaries in the independent circuit are of similar type and power-ratio, and the particular arrangements of the independent circuit are such as to give even tripping values for all types of fault, i. e., are such that (when a fault of given magnitude in amperes occurs) the trip coil or coils receive the same current irrespective of whether the fault is to earth or between phases.

The employment of current transformers of different ratios in the three phases will, however, enable simpler arrangements of the independent circuit to be used whilst still giving even tripping values.

One such arrangement is shown in Figure 4 in which the independent circuit comprises three current transformers whose secondaries N N¹ N² are arranged in reverse delta, one of the transformers N¹ having a ratio different from that of the other two, and a single trip coil O, which is connected in series with the transformer secondaries N N¹ N² and is normally short-circuited by the relay contacts. In Figure 4 this independent circuit is shown in association with a three-core pilot circuit arranged as in Figure 2 with the three relay contacts K K¹ K² connected in series with one another, but it will be understood that it may similarly be employed with a two-core pilot circuit such as that shown in Figure 1.

In all the arrangements more particularly described the relay contacts have been described as normally being closed and short-circuiting the trip coils, which are permanently connected in the independent circuit. It will be appreciated however that the desired results can also be obtained with the relay contacts normally open but acting when closed to bring normally open-circuited trip coils into the independent circuit.

The arrangements can also be modified in other ways within the scope of the invention.

What I claim as my invention and desire to secure by Letters Patent is:—

1. In a protective arrangement for an A. C. electric circuit, the combination with a pilot wire system, of protective apparatus disposed at each end of the protected circuit and comprising protective current transformers having their secondaries connected in the pilot circuit, at least one relay in the pilot circuit, a circuit-breaker controlling the protected circuit, at least one trip coil controlling the circuit breaker, separate current transformers whose primaries are connected in the protected circuit, an independent circuit containing the trip coils and the separate current transformer secondaries, and means whereby when a relay operates at least one of the trip coils is energized from a separate current transformer secondary to open the circuit-breaker.

2. In a protective arrangement for a polyphase electric circuit, the combination with a pilot wire system, of protective apparatus disposed at each end of the protected circuit and comprising protective current transformers having their secondaries connected in the pilot circuit, at least one relay in the pilot circuit, a circuit-breaker controlling the protected circuit, at least one trip coil controlling the circuit-breaker, separate current transformers whose primaries are respectively connected in the several phases of the protected circuit, and means whereby when a relay operates at least one of the trip coils is energized from a separate current transformer secondary to open the circuit-breaker, the separate current transformer secondaries being so connected to the trip coils as to give equal values of the tripping current for all types of fault.

3. In a protective arrangement for a three-phase electric circuit, the combination with a pilot wire system, of protective apparatus disposed at each end of the protected circuit and comprising protective current transformers having their secondaries connected in the pilot circuit, at least one relay in the pilot circuit, a circuit-breaker controlling the protected circuit, two trip coils controlling the circuit-breaker, three separate similar current transformers whose primaries are connected respectively in the three phases of the protected circuit and whose secondaries are arranged in reverse delta, and means whereby when a relay operates at least one of the trip coils is energized from a separate current transformer secondary to open the circuit-breaker, the separate current transformer secondaries being so connected to the two trip coils as to give equal values of the tripping current for all types of fault.

4. In a protective arrangement for an A. C. electric circuit, the combination with a two-core pilot circuit, of protective apparatus disposed at each end of the protected circuit and comprising protective current transformers having their secondaries connected in the pilot circuit, a single relay in the pilot circuit, a circuit-breaker controlling the protected circuit, at least one trip coil controlling the circuit-breaker, separate current transformers whose primaries are connected in the protected circuit, and means whereby when the relay operates at least one of the trip coils is energized from a separate current transformer secondary to open the circuit-breaker.

5. In a protective arrangement for a three-phase electric circuit, the combination with a two-core pilot circuit, of protective apparatus disposed at each end of the protected circuit and comprising protective current transformers having their secondaries connected in the pilot circuit, a single relay in the pilot circuit, a circuit-breaker controlling the protected circuit, two trip coils controlling the circuit-breaker, three separate similar current transformers whose primaries are connected respectively in the three phases of the protected circuit and whose secondaries are arranged in reverse delta, and means whereby when the relay operates the trip coils are energized from the separate current transformer secondaries to open the circuit-breaker.

6. In a protective arrangement for an A. C. electric circuit, the combination with a pilot wire system, of protective apparatus disposed at each end of the protected circuit and comprising protective current transformers having their secondaries connected in the pilot circuit, at least one relay in the pilot circuit, a circuit-breaker controlling the protected circuit, at least one normally short-circuited trip coil controlling the circuit-breaker, separate current transformers whose primaries are connected in the protected circuit and whose secondaries serve to energize the trip coils, and means whereby the operation of a relay removes the short-circuit from at least one of the trip coils and thus causes the circuit-breaker to open.

7. In a protective arrangement for a three-phase electric circuit, the combination with a two-core pilot circuit, of protective apparatus disposed at each end of the protected circuit and comprising protective current transformers having their secondaries connected in the pilot circuit, a single relay in the pilot circuit, a circuit-breaker controlling the protected circuit, two normally short-circuited trip coils controlling the circuit-breaker, three separate similar current transformers whose primaries are connected respectively in the three phases of the protected circuit and whose secondaries arranged in reverse delta serve to energize the two trip coils, and means whereby the operation of the relay removes the short-circuit from the two trip coils and thus causes the circuit-breaker to open.

In testimony whereof I have signed my name to this specification.

REGINALD WILLIAM BILES.